US008788809B2

(12) United States Patent
Kelley

(10) Patent No.: US 8,788,809 B2
(45) Date of Patent: Jul. 22, 2014

(54) METHOD AND APPARATUS TO CREATE A SECURE WEB-BROWSING ENVIRONMENT WITH PRIVILEGE SIGNING

(75) Inventor: Brian H. Kelley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 669 days.

(21) Appl. No.: 12/430,750

(22) Filed: Apr. 27, 2009

(65) Prior Publication Data
US 2010/0275014 A1  Oct. 28, 2010

(51) Int. Cl.
*H04L 9/32* (2006.01)
*G06F 21/51* (2013.01)
*G06F 21/44* (2013.01)

(52) U.S. Cl.
CPC .............. *G06F 21/51* (2013.01); *G06F 21/445* (2013.01)
USPC ................. 713/156; 713/187; 713/157; 726/2

(58) Field of Classification Search
CPC ............................... G06F 21/51; G06F 21/445
USPC ........ 726/17, 18, 19, 20, 27, 2; 713/187, 156, 713/157
See application file for complete search history.

(56) References Cited

U.S. PATENT DOCUMENTS

| | | | | |
|---|---|---|---|---|
| 5,629,980 | A * | 5/1997 | Stefik et al. | 705/54 |
| 6,212,635 | B1 * | 4/2001 | Reardon | 713/165 |
| 6,223,291 | B1 * | 4/2001 | Puhl et al. | 726/28 |
| 6,308,266 | B1 * | 10/2001 | Freeman | 713/156 |
| 7,185,364 | B2 * | 2/2007 | Knouse et al. | 726/8 |
| 7,287,274 | B1 | 10/2007 | Houlding | |
| 7,415,620 | B2 * | 8/2008 | England et al. | 713/193 |
| 7,509,497 | B2 * | 3/2009 | Joy et al. | 713/172 |
| 7,624,440 | B2 * | 11/2009 | Jallad et al. | 726/16 |
| 7,725,928 | B2 * | 5/2010 | Durfee et al. | 726/5 |
| 8,090,939 | B2 * | 1/2012 | Ali et al. | 713/156 |
| 2003/0050960 | A1 * | 3/2003 | Kawamura et al. | 709/202 |
| 2005/0091536 | A1 * | 4/2005 | Whitmer et al. | 713/201 |

FOREIGN PATENT DOCUMENTS

| | | |
|---|---|---|
| CN | 1349625 A | 5/2002 |
| CN | 1633065 A | 6/2005 |
| CN | 101360102 A | 2/2009 |
| EP | 1113361 A1 | 7/2001 |
| JP | 2006040146 A | 2/2006 |

OTHER PUBLICATIONS

Gong L., et al., "Going Beyond the Sandbox: An Overview of the New Security Architecture in the Java Development Kit 1.2, XP002250254," Proceedings of the USENIX Symposium on Internet Technologies Andsystems, 1997, XX, XX, pp. 1-10.
International Search Report and Written Opinion—PCT/US2010/032422, International Search Authority—European Patent Office—Jul. 21, 2010.

* cited by examiner

*Primary Examiner* — Jung Kim
*Assistant Examiner* — Thomas Ho
(74) *Attorney, Agent, or Firm* — James T. Hagler

(57) ABSTRACT

Devices and methods use digital certificates and digital signatures to enable computing devices, such as mobile devices, to trust a server attempting to access a resource on the computing device. The server may present the computing device with a digital certificate issued by a trusted third party which includes information so that the computing device can determine which resources the server should be trusted to access. The computing device can determine that the digital certificate was issued by a trusted third party by examining the chain of digital certificates that may link the server with an inherently trusted authority.

56 Claims, 11 Drawing Sheets

METHOD AND APPARATUS TO CREATE A SECURE WEB-BROWSING ENVIRONMENT WITH PRIVILEGE SIGNING

FIELD OF THE INVENTION

The present invention relates generally to computer network communications, and more specifically to web browsing digital certificates.

BACKGROUND

Emerging Internet technologies promise increased integration between communications devices and server-based applications. Client-server applications have many advantages, and are increasingly popular. Such applications allow the majority of the application data to exist in one server location, increasing data security and eliminating unnecessary redundant data copies. Similarly, a majority of the application programming code and data files can exist in one location where it is more easily maintained by the application developers. Further, client-server applications can be designed so that rigorous processing tasks occur on the server-side, which allows robust applications to exist on smaller and less-powerful devices such as laptop computers and mobile handsets.

Client-server technologies have evolved to encompass mobile code, as exemplified in JavaScript® embedded in HTML. The capabilities of web-based applications are currently limited by the lack of functionality available to mobile code within the client-side execution environment. While languages such as JavaScript® could be designed to allow advanced client-side functionality, such an implementation is not ideal from a security standpoint. In an environment where security is not a concern, server-based applications would customize content based on location, synchronize remote files with client files, and link desktop functionality with server-based functions. However, Internet users are generally not sophisticated enough to make informed decisions regarding whether to allow websites to access various resources on the client. This is evidenced by the vast number of products designed to block malicious code from websites. Therefore, any advances in the functionality of server-based scripting might do more harm than good.

SUMMARY

In various embodiments, digital certificates and digital signatures are used to allow a mobile device to determine whether a web server should be allowed to access the various resources on the mobile device. Digital certificates allow mobile devices and mobile device users to know the identity of a web server, as well as whether that server is trusted to access a specific resource. Mobile devices can establish the trustworthiness of a web server or downloaded scripts by examining the issuer of the digital certificate presented, and trace the trustworthiness through a chain of digital certificates to an inherently trusted authority.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
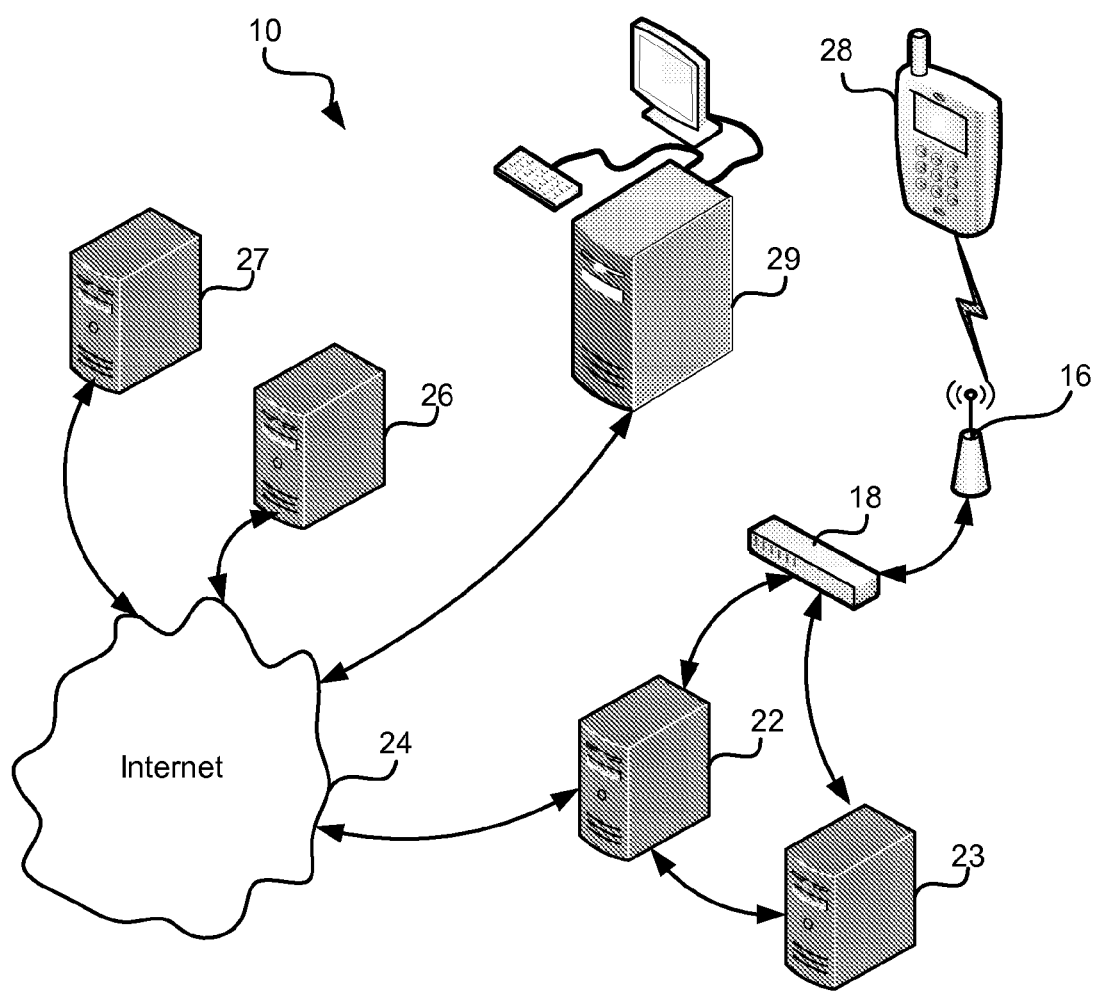
FIG. 1 is a system block diagram of wireless cellular network.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "mobile handset," "handset," "mobile device" and "handheld device" refer to any one or all of cellular telephones, personal data assistants (PDA's), palm-top computers, wireless electronic mail receivers and cellular telephone receivers (e.g., the Blackberry® and Treo® devices), multimedia Internet enabled cellular telephones (e.g., the iPhone®), and similar personal electronic devices which include a programmable processor and memory and the capability to connect to a wireless network. The terms may also encompass personal computers, such as a laptop computer or a desktop computer, when used in the description of the various embodiments which may also be implemented on personal computers. While the various embodiments refer to cellular telephone network systems including cell towers of such networks, the scope of the present invention and the claims encompass any communication system including disperse wireless communication cells, including for example, WiFi, WiMax, and other wireless data network communication technologies, as well as wired networks such as LANs, WANs and the Internet.

As used herein, the term "script" refers to any or all computer programs including both computer programs written in a traditional scripting language, such as JavaScript® or Perl®, that is designed to control an executing computer program, and computer programs written in a stand-alone language, such as C++ or Java® that is compiled for execution directly on an operating system or runtime environment.

As used herein, the terms "browser" and "web browser" refer to any runtime environment that is capable of executing scripts or code, including browsers such as Internet Explorer® and Firefox®, programming language runtime environments such as a Perl® interpreter and the Binary Runtime Environment for Wireless BREW®, as well as operating systems that have built in script-executing capabilities.

As used herein, the terms "client" and "server" either refer to a device, such as a mobile handset or personal computer, with a processor capable of executing a computer program and a means for communicating with other devices executing computer programs such as an Internet connection or a computer program, or refer to a computer program, such as a web browser or an operating system, that includes a link for communicating with computer programs executing on other operating systems, such as an Internet Connection. The terms "client" and "server" are descriptive in nature, and are not intended to limit the scope of the invention or the claims Mobile handsets and personal computers often have web browsers or similar types of programs that can execute code downloaded from websites. The browser, along with associated plug-ins and extensions, serves as a gateway between a mobile handset and a web site. The website may present a script to the mobile handset, but the browser is the program which executes the script. For example, if a web-based email program requests access to the mobile handset's call history to correlate emails with handset calls, it may generate a script that requests the browser to send a list of calls to the website via an http request. The browser would send a request to the operating system of the mobile handset, and the operating system would compile the list and pass it to the browser.

Of course, not all websites should be allowed to access the call history or other types of personal and sensitive data resident on a mobile device or personal computer. The problems of "hackers," malicious websites and other abuses of the Internet are well known. To defend personal computers from such attacks, many firewall programs are commercially available and widely used to deny access to websites that are not trusted. In mobile devices, such as mobile phones, websites are generally blocked from accessing system and personal data as part of the devices' operating system software. While these methods preclude some very useful applications and services that otherwise could be provided via the Internet, such measures are necessary to protect mobile devices from attack by untrusted sites.

The various embodiments provide methods to establish trust between a website and a mobile handset. The various embodiments make use of digital certificates published by a certificate authority which enable the mobile handset to confirm either trust in the website or trust in the script issued from the website. A certificate authority is a trusted entity that can verify that another entity is trusted, as evidenced by the digital certificate. This is known as a "chain of trust" or "trust chaining." A chain of trust must originate from a trusted entity. Entities that are inherently trusted are referred to as root authorities. An operating system will often maintain a set of root certificates or a "root set", which are the digital certificates of various root authorities.

The various embodiments may be employed in a variety of wired and wireless networks, including for example a wireless network employing cellular data communication links. By way of example, FIG. 1 shows a block diagram of a communication network 10 including the Internet 24 and a cellular network in which some communication devices, such as mobile handsets 28 and personal computers 29, have the additional ability to execute scripts that are downloaded from web servers.

In this example network 10, the base station 16 is a part of a cellular network that includes elements required to operate the network, such as a mobile switching center (MSC) 18. In operation, the MSC 18 is capable of routing calls and messages to and from the mobile handset 28 via the base station 16 when the mobile handset 28 is making and receiving calls.

The MSC 18 also provides a connection to telephone landline trunks (not shown) when the mobile handset 28 is involved in a call.

Further, the MSC may be coupled to a server gateway 22 coupled to the Internet 24. Through the server gateway 22 the mobile handset 28 may communicate with web servers 26 and 27 via the Internet. Also, personal computers 29 may communicate with web servers 26 and 27 via the Internet using conventional Internet access methods, such as provided by an Internet Service Provider. Such communications may be sent using file transfer protocol (FTP), hypertext transfer protocol (HTTP), and hypertext transfer protocol over secure socket layers (HTTPS). The communications may consist of various types of files, including hypertext markup language (HTML), image files, and client-side scripts in languages such as JavaScript. Additionally, such messages may include files related to various security schemes, such as digital certificates and signing keys. Additionally, this example network 10 includes a certificate authority (CA) server 23 which is a web server that is configured to act as a certificate authority, including the ability to issue digital certificates and public and private keys to web servers such as the web servers 26 and 27 in this exemplary network. Further, the CA server 23 may communicate with mobile handsets 28 via the cellular network to keep their set of root certificates current.

Figure 2:
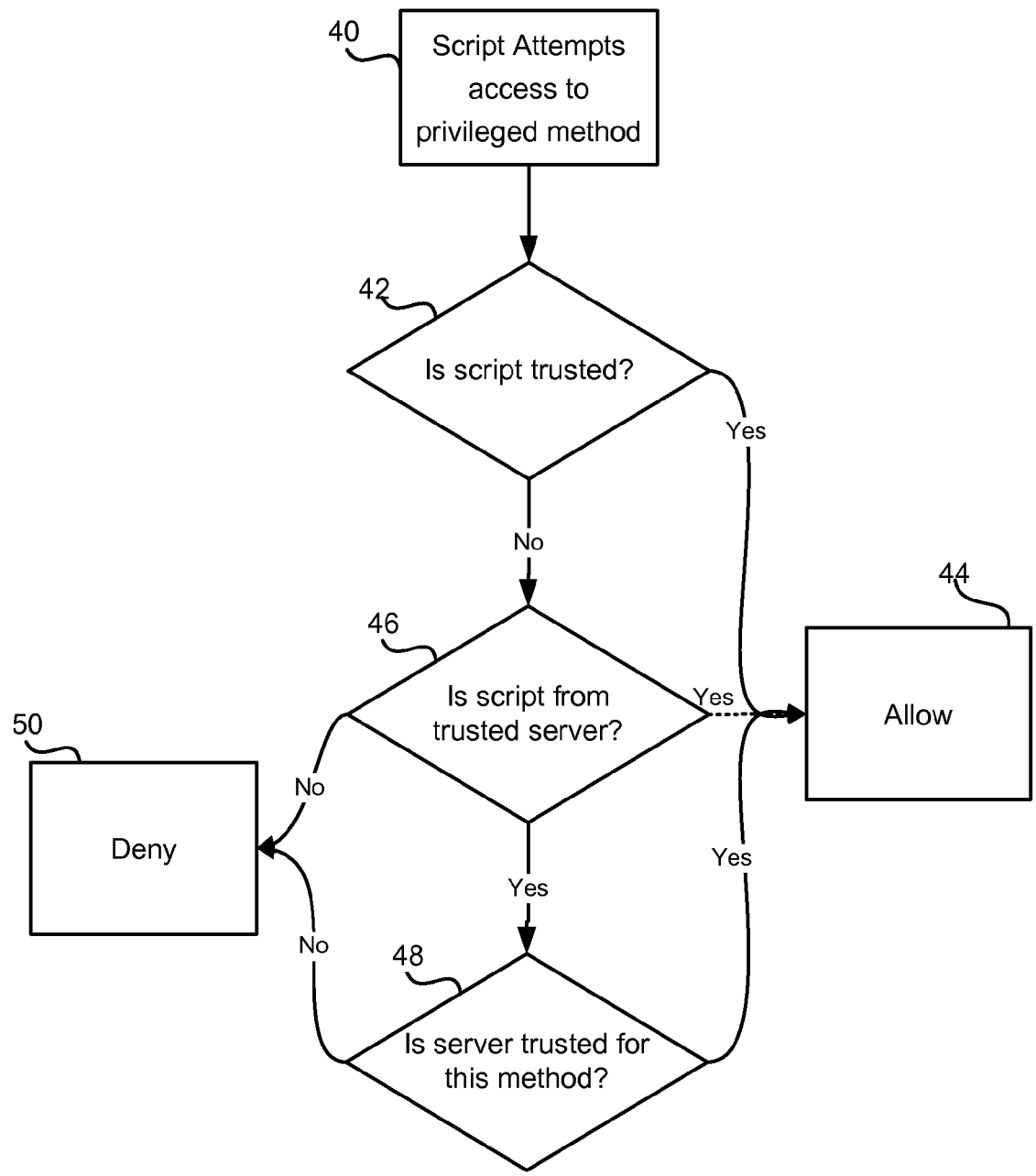
FIG. 2 is a process flow diagram of an embodiment method suitable for determining trustworthiness of a script.

In order to allow a client-side script to securely access various resources or data on a computer, a mobile handset 28 or web browser operating on a personal computer 29 may be programmed or configured to take certain measures before executing steps that would grant the script access to such resources or data. An overview of an example of such measures is illustrated in FIG. 2, which shows steps that may be executed on a mobile handset. The process may be triggered when the script attempts to access a privileged resource, data or method, step 40. An example of a privileged method include a request to access a mobile device's call history received from a web-based email program, or an attempt by a web-based mapping program to access the GPS-coordinates of the mobile device. Prior to granting access to the privileged resource, the browser may be configured to verify that the particular script which is attempting to access the resource is trusted or otherwise not malicious. This overview method provides alternative methods for such verification.

First, the mobile handset can determine if the access attempt is made by a script that is absolutely trusted, test 42. Whether a file is "trusted" can be determined in a number of methods. Some such methods involve the use of digital certificates issued by certificate authorities, as described below. If the script is absolutely trusted (i.e. test 42="Yes"), the browser can execute the script, step 44. It is useful for code to be absolutely trusted, regardless of the direct source of the script, when the code does not change often. For example, if a web-based game can be absolutely trusted the game may be developed in one location, and distributed to various web sites after being designated as trusted. The game can then be trusted by the receiving browser even if the server on which it resides is unknown to the mobile handset or otherwise untrustworthy. The extent to which the script is trusted (i.e. whether the game can access a resources like a camera or transfer a file from the mobile handset to a remote server) may be determined at the time the code is marked as trusted and included within the trust certificate so that the mobile device can determine which particular resources and privileged methods the script can access.

If the script is not absolutely trusted (i.e. test 42="No"), then the browser may determine trust through an alternate method. The browser may determine if the server which provided the code is trusted, test 46, and if so allow the access, step 44. If the server is not trusted (i.e. test 46="No"), then the browser may determine that the script is unsafe and deny access to the protected method, step 50. However, the browser may not always execute a script solely because the server is trusted. Instead, it may also verify that the server is trusted with respect to the specific method or resource, test 48. If the server is not trusted for the specific method or resource (i.e. test 48="No"), the browser may deny access to the method, step 50. If the server is trusted for the specific method or resource (i.e. step 48="Yes"), the browser may allow access to the resource, step 44.

The flow diagram illustrated in FIG. 2 may be implemented in embodiments that determine whether a script can be granted access to a restricted resource at the time a request is made for access to the resource. Such an embodiment, which may be referred to as a "run time" or during execution embodiment, has various advantages and disadvantages. An alternative embodiment, which also has various advantages and disadvantages, is to determine which resources the script will require before the script is executed. To implement such a "load time" or prior to execution embodiment, the web browser may examine the digital certificates prior to execution and generate a list of resources that may be required. In a further alternative embodiment, scripts that require access to potentially protected resources may indicate the required resources within the remarks section of the script. In such an embodiment, the remarks section of the script can be read before the script executes to determine the protected resources that may be accessed. Once the mobile device or web browser has the list of resources that a script will require, it can perform checks of the script's trust status and permission set in a "batch" and prevent the script from executing if it requires a resource beyond its permission set.

Figure 3A:
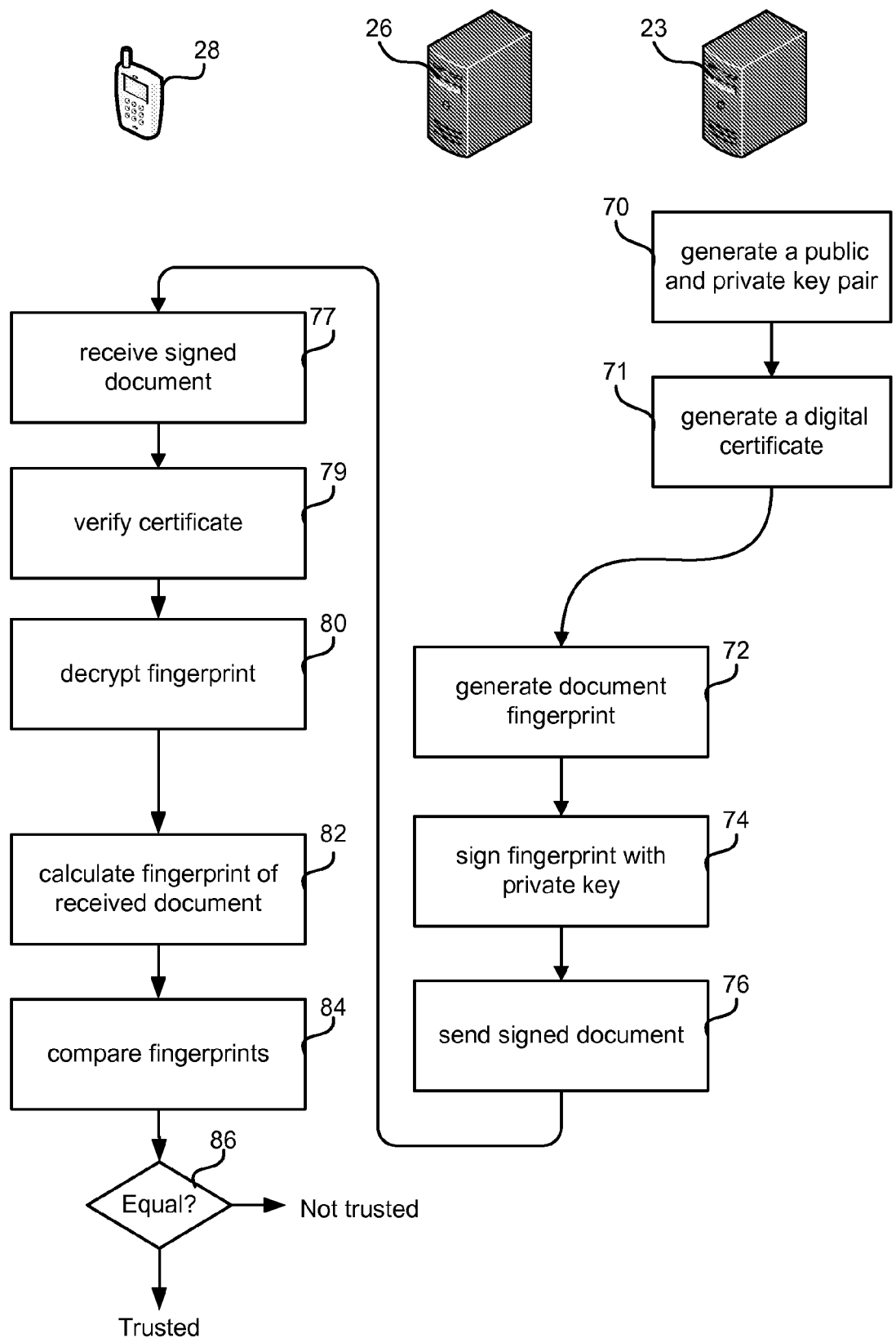
FIG. 3A is a process flow diagram of an embodiment method suitable for digitally signing and verifying a document.

As mentioned above, the various embodiments enable the browser to determine if a website is trusted using digital signatures. An overview of how digital signatures work is shown in FIG. 3A, which shows steps that may be implemented in software instructions executing on one or more servers 23, 26 and a personal computer or mobile device 28. A certificate authority (CA) server 23 may generate an encryption key pair that a web server 26 may use to digitally sign a document, step 70. As is well known in the computer arts, encryption keys are large integers which are typically prime numbers. Certain encryption algorithms, such as the well known RSA, use different keys for encryption and decryption, and together they are known as a key pair. A public key/private key pair is a key pair in which the public key, which is often the decryption key, is published or included in documents, while the private key, which is often the encryption key, is kept private. Any file or sequence of computer data which can be successfully decrypted by the public key must have been encrypted by the private key. Therefore, if the web server 26 is the only entity to know the private key, the identity of the web server 26 can be verified. However, this method of identity verification requires the public key to be verifiable. If a client application is mistaken as to the value of the public key, the application can be fooled into trusting a malicious entity. A digital certificate is a tool that a client application can use to verify the public key. The CA server 23 may generate a certificate that contains information such as the name and URL of the web server 26, as well as the actual public key of the web server 26, and "sign" the certificate by encrypting it with its own private key (i.e. not the private key of the web server 26), step 71.

The web server 26 begins the process of signing a document, such as a JavaScript file, by calculating its fingerprint, step 72, using a hash technique such as MD2. Once the document fingerprint has been generated, the web server 26 may "sign" the fingerprint by encrypting the fingerprint using the private key as the encryption key, step 74. The web server 27 may then transmit the original document along with the signed fingerprint and the digital certificate to the mobile handset 28, step 76.

The documents are received by the mobile handset 28, step 77, and the mobile handset 28 can determine the public key of the CA Server 23 from its root set stored in memory. As described above, the root set is a set of certificates that the mobile handset 28 may inherently trust (i.e. the mobile handset 28 may assume that all certificates in its root set are authentic). Using the public key of the CA server 23 as the decryption key, the mobile handset may decrypt the digital certificate to verify the public key of the web server 26, step 79. With the public key of the web server 26 as the decryption key, the mobile handset 28 may decrypt the signed fingerprint to discover the original fingerprint, step 80. The mobile handset may also calculate the fingerprint of the document using the same hash technique (e.g., MD2), step 82. The mobile handset may then compare the two fingerprints for equality, step 84. If the fingerprint calculated by the mobile handset equals the decrypted fingerprint, then the mobile device has confirmed that the document is from a source trusted by the CA server 23, and that the document has not been altered since it left the control of the web server 26. Thus, if the calculated and decrypted document fingerprints are equal, test 86, the document is trusted, but if not, the document is not trusted.

Figure 3B:
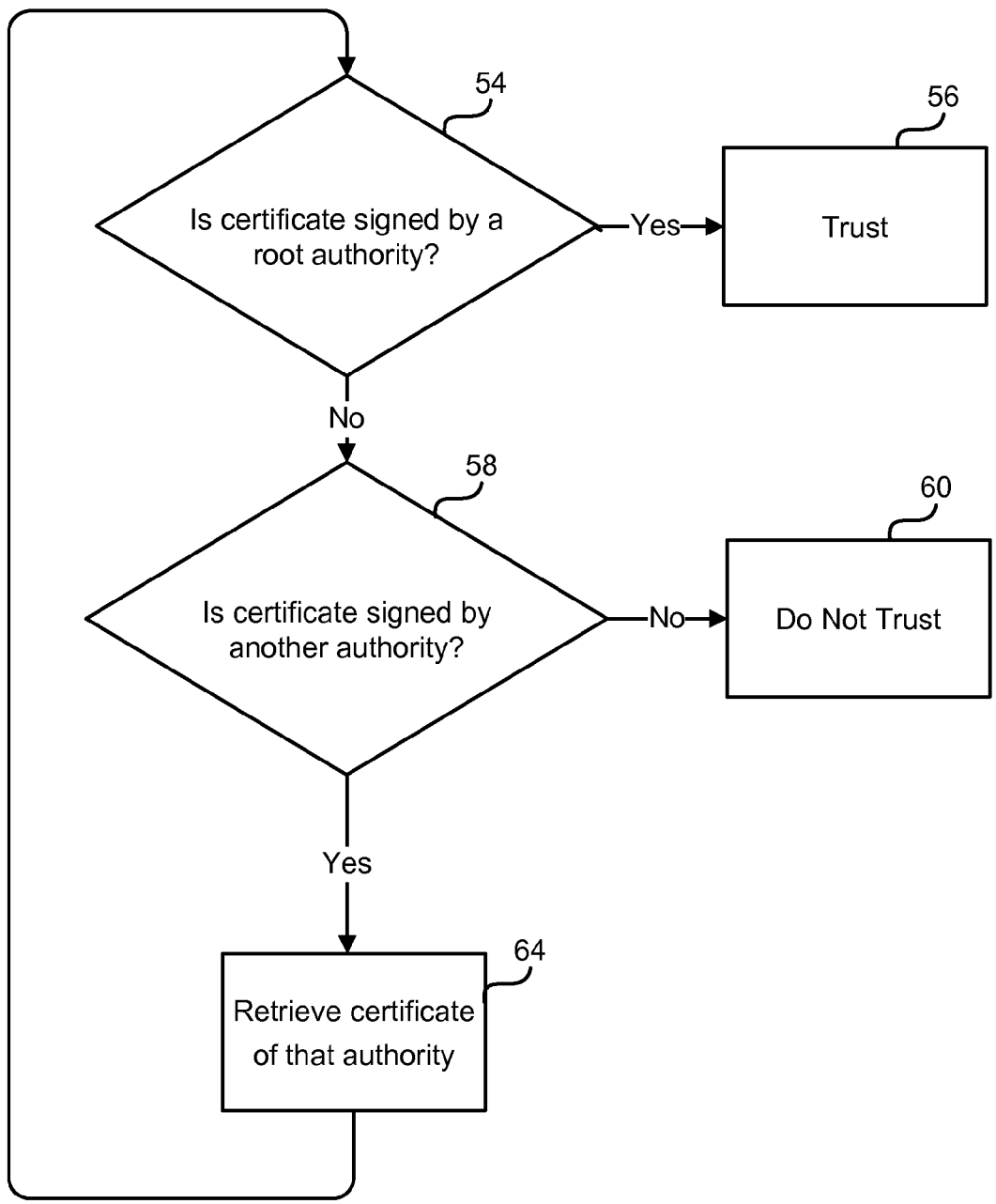
FIG. 3B is a process flow diagram of an embodiment method suitable for verifying digital certificates.

There may be commercial and/or technical benefit in "trust-chaining" or allowing certificates to be issued by sources other than an inherently trusted certificate authority ("root authority"). In such a situation mobile handsets would either need to trust the new certificate authority inherently by adding the certificate of the new certificate authority to the root set, or perform some steps to verify that the new certificate authority is trusted by the root authority. An example of a method that accomplishes this task is illustrated in FIG. 3B, which shows steps that may be executed on a mobile handset or a personal computer.

A mobile handset that is attempting to verify the trustworthiness of a presented certificate may begin by examining the certificate to determine if the certificate is signed by a root authority, test 54. The presented certificate will typically conform to a protocol standard, such as the well known ITU-T X.509, which includes data regarding the identity of the signing authority. The mobile handset may compare the identity of the signing authority with the set of certificates in the root set. If there is a match (i.e. test 54="Yes"), then the mobile handset may assume the presented certificate is trustworthy, step 56. If the mobile handset does not recognize the current certificate as one signed by a root authority, it may determine if the certificate was signed by another server (as opposed to being self-signed as some root certificates are), test 58. If the current certificate was not signed by another authority (i.e. test 58="No"), then the mobile handset may determine that the certificate is untrustworthy, step 60. However, if the current certificate was signed by another authority (i.e. test 58="Yes"), the mobile handset may then retrieve the certificate of that authority, step 64. The chain of certificates may be presented all at once, or they may be retrieved from the certificate authority on demand as provided for in the certificate. Once the mobile handset has located the new certificate (i.e. step 64), it can determine if that certificate is trusted by repeating similar steps for the new certificate. In most cases, the mobile handset will eventually determine which certificates are chained from an inherently trusted authority and which are not.

Various embodiments may employ a system of permissions to make trustworthiness more precise. For example, it may not be ideal to allow a website full access to a mobile handset, even though it can be trusted for some uses. Alternatively, some certificate authorities may be competent to grant trustworthiness to some resources but not others. This type of information can be embedded into the digital certificates issued by certificate authorities. It is well known in the arts for digital certificates to include information such as the URL of the website and the name of the entity to which the URL is registered. In fact, digital certificates can hold any type of computer-readable data, be it binary, text, or anything else. In some embodiments, the certificate authorities may use a series of unique identifiers in a well-defined namespace to communicate permissions. Such listed permissions may include a list of mobile handset resources or categories of resources for which the server has been granted permission to access. For example, a web browser may grant a web site access to the geographic coordinates of the mobile handset only when each certificate in the trust chain includes the explicit phrase "grant geographic coordinates" or an equivalent digital code or symbol. It is also possible for certificate authorities to issue certificates that are valid for signing documents, but not for issuing another certificate, which has the effect of limiting the number of possible links in the trust chain. In such an embodiment, a web browser can determine whether the server has been granted permission to access a requested resource based upon the digital certificate issued to the server, such as by reading the list of permissions included in the certificate. Thus, a web browser or mobile device may not trust a certificate that is signed by an entity whose certificate lacks the phrase "grant certificate authority" or an equivalent digital code or symbol.

In addition to permission schemes that incorporate digital certificates, users may explicitly grant certain permissions to web sites. For example, a user may want to execute a web application that requires access to a resource for which the website has not been certified by a trusted authority. This website may be a well-known commercial website that has business arrangements that prevent it from cooperating with any of the root authorities or their derivatives. Alternatively, it may be a website that the user personally developed. The user may expressly grant resources or groups of resources to the websites based on the URL. While this option may have disadvantages from a security perspective, it may also have commercial advantages that overcome the disadvantages, especially for knowledgeable users.

In a further embodiment, the script itself, or data attached to the script, may include information which limits the permissions granted to the script. In this embodiment, the script or data attached to the script may limit access to resources to fewer than those to which the server is granted permission to access in the digital certificate issued to the server.

Figure 4A:
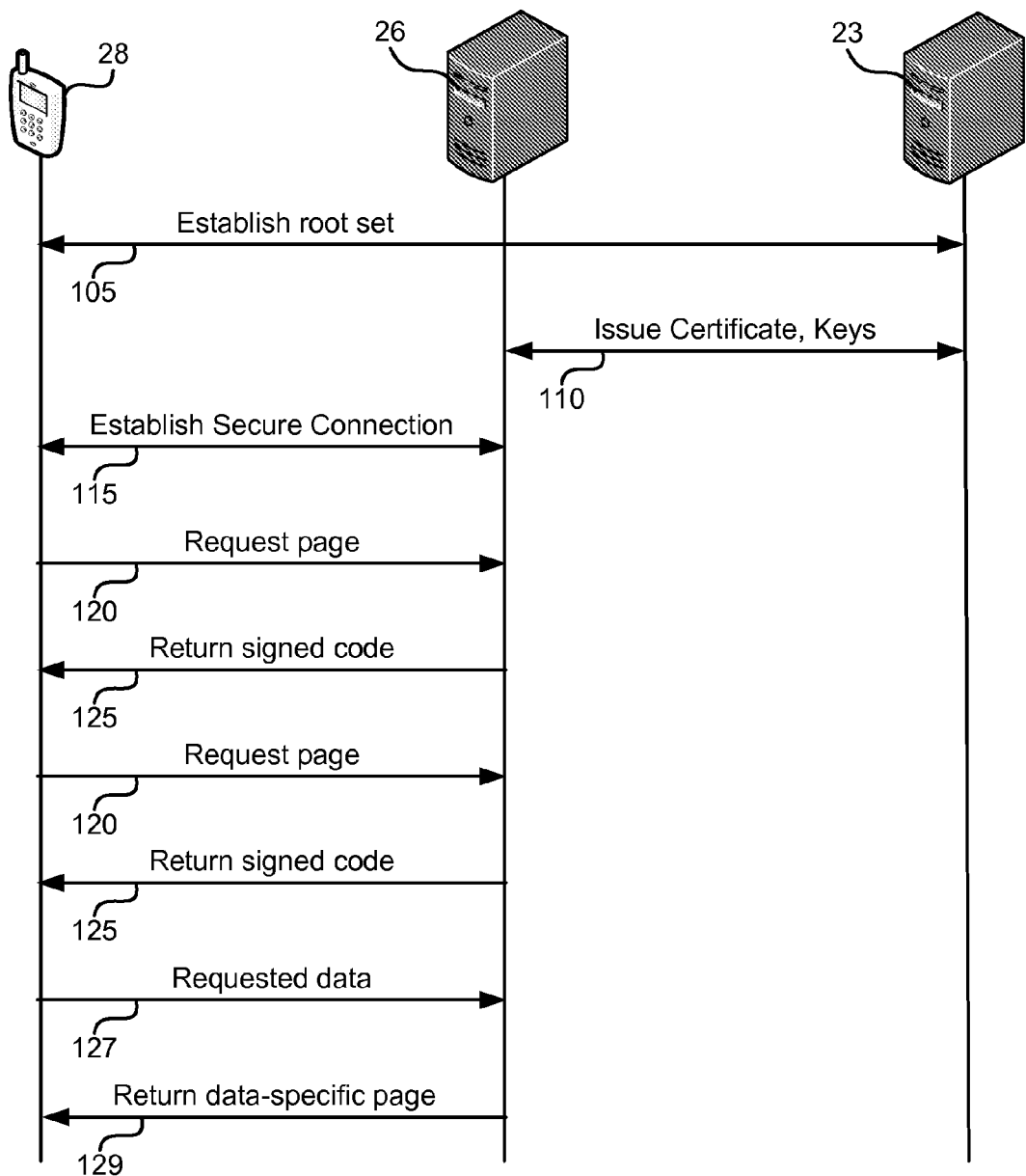
FIGS. 4A and B are a message flow diagrams of embodiments for establishing a trusted browsing environment.

By utilizing some the aforementioned security techniques, a web browsing environment can be made secure. Communications enabling such an environment are illustrated in FIG. 4A, which is a timing diagram that shows certain communications which may occur between various systems. In order to facilitate the trust chain, a CA server 23 may send the root set of certificates to the mobile handset 28, messages 105. This communication of root set certificates may be transmitted at any time and is typically periodically updated as part of the normal services provided to mobile devices. The CA server 23 may also create a certificate and the key pair to send to the web server 26, messages 110. With these security tools in place, the mobile handset 28 can optionally browse to a web site hosted by the web server 26 and open a secure connection between the device and the server, optional messages 115. Alternatively, the mobile handset 28 can use a secure connection, such as Transport Layer Security (TLS), or simply rely on the Domain Name System (DNS) infrastructure to communicate with the server 26. The mobile handset 28 may then request a web page from the web server 26, message 120. The web server 26 may respond to the request with signed code for the mobile handset 28 to execute, message 125. The code may be signed by the web server 26 in a manner similar to the digital signature method described above with reference to FIG. 3A, or the code may be sent to the CA server 23 via an HTTP request where it can be signed by the CA server 23 and returned to the web server 26 via an HTTP response. This process may be repeated one or more times as the user of mobile handset 28 continues to browse the website, messages 120 and 125. If the mobile handset 28 verifies the digital signature provided with the code (as described above with reference to FIG. 3A), the mobile handset 28 may provide the script access to a privileged resource, data or method which may then transmit some or all of such confidential data to the server 26, message 127. Using such confidential data, the server 26 may then provide a web page, data or script which is based on, responsive to or otherwise specific to the confidential information, message 129. For example, if the requested data provided to the server 26 in message 127 are GPS coordinates of the mobile device 28, the server 26 may provide a webpage that is specific to the location of the device, such as a local map or phone numbers of nearby businesses.

Figure 3C:
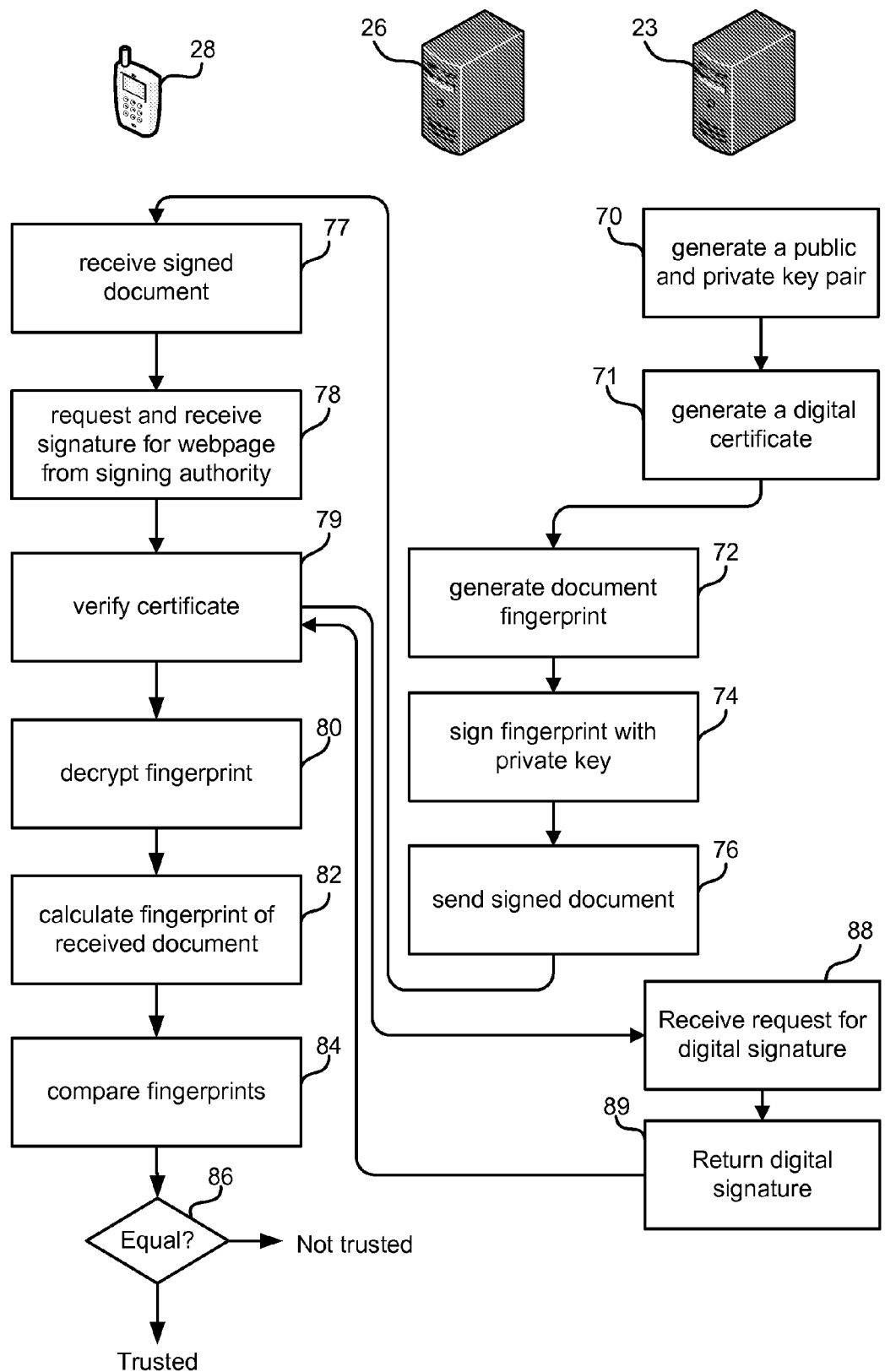
FIG. 3C is a process flow diagram of an alternative embodiment method suitable for digitally signing and verifying a document.
Figure 4B:
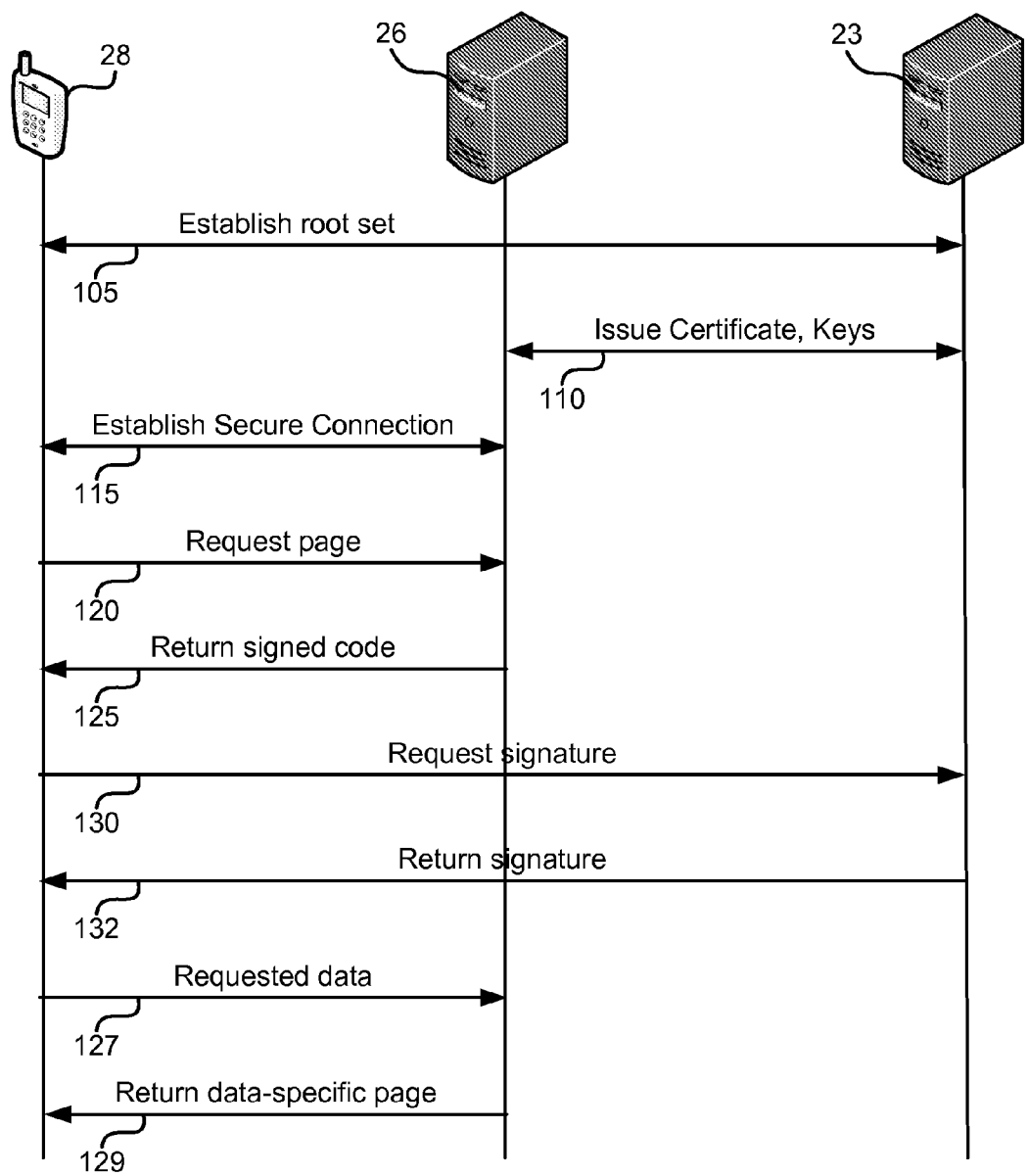

In an alternative embodiment, a mobile device 28 may request and receive a digital signature from a signing authority separate from receiving a webpage from another server. This embodiment is illustrated in FIGS. 3C and 4B. Referring to FIG. 3C, the process proceeds similar to that described above with reference to FIG. 3A with the addition of the mobile device sending a separate http request to the signing authority 23 or the server of the original web application provider requesting a digital signature for the webpage and receive the signature in response, step 78. At the signing authority 23, the request for a digital signature is received, step 88, and in response, the signing authority 23 returns a digital signature that may be stored in memory of the server, step 89. This additional step is illustrated in the message flow diagram shown in FIG. 4B as a signature request to the signing authority, message 130, followed by transmission of the signature back to the mobile device, message 132.

Figure 5:
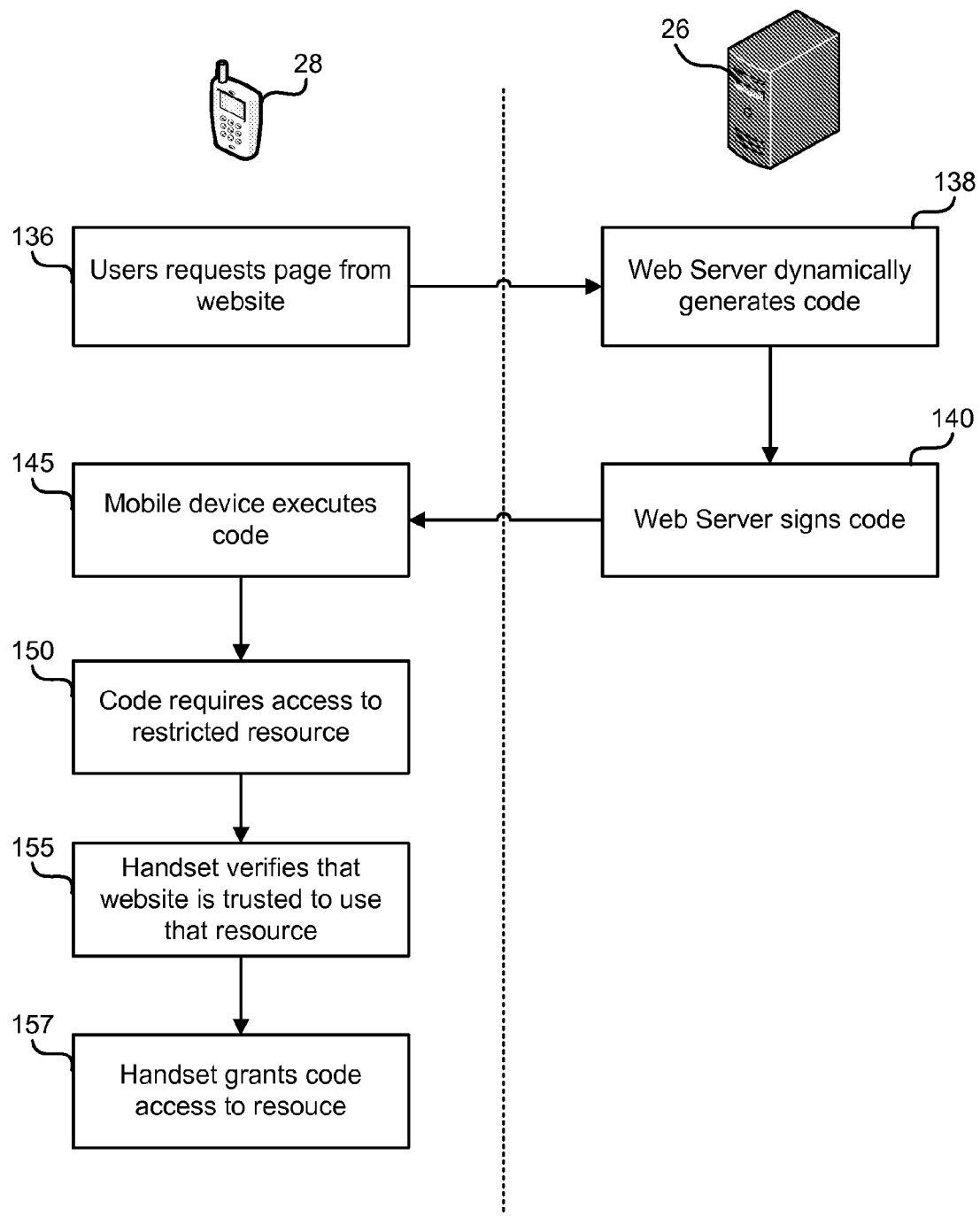
FIG. 5 is a process flow diagram of an embodiment method suitable for establishing a trusted browsing environment.

A more detailed illustration of how a mobile handset and a web server may interact is shown in FIG. 5, which shows steps that can be implemented in software instructions executed on the server 26 and a mobile device 28 or a personal computer. The user of the mobile handset 28 can request a web page from the web server 26, step 136. This request may be transmitted using well known cellular data network methods and via the Internet. In response, the web server 26 may generate code in a known manner such as using a PHP interpreter, step 138. The web server 26 may sign this dynamically generated code, step 140, using methods described more fully above with reference to FIG. 3A. The web server can then transmit the signed code back to the mobile device, such as by using known Internet and cellular data network methods. Once the mobile device receives the signed code, it may begin to execute the code, step 145. When the code requests access to a restricted resource such as a certain file, step 150, the mobile handset 28 may pause execution of the script to verify if the code is trusted to access that resource, step 155. This verification is performed using the methods described above with reference to FIG. 3A. If the mobile handset determines the code is trustworthy it may grant the access, step 157.

In an alternative embodiment, a digital certificate for the server can be pre-configured in the client (i.e., mobile device), just as root keys are. Thus, in this embodiment the step of receiving a digital certificate described above is optional because the digital certificate may already be available within the mobile handset memory. In such situations, the process for verifying and executing an application involves the mobile device receiving a script for execution from the server, the mobile device verifying that the server from which the script was obtained is named in a digital certificate (which may already be in memory or may be provided separately), the mobile device determining which permissions have been granted to the server according to the contents of the certificate, and the mobile device enabling the script to access a protected resource only when an associated permission has been granted to the server from which the script was obtained.

Figure 6:
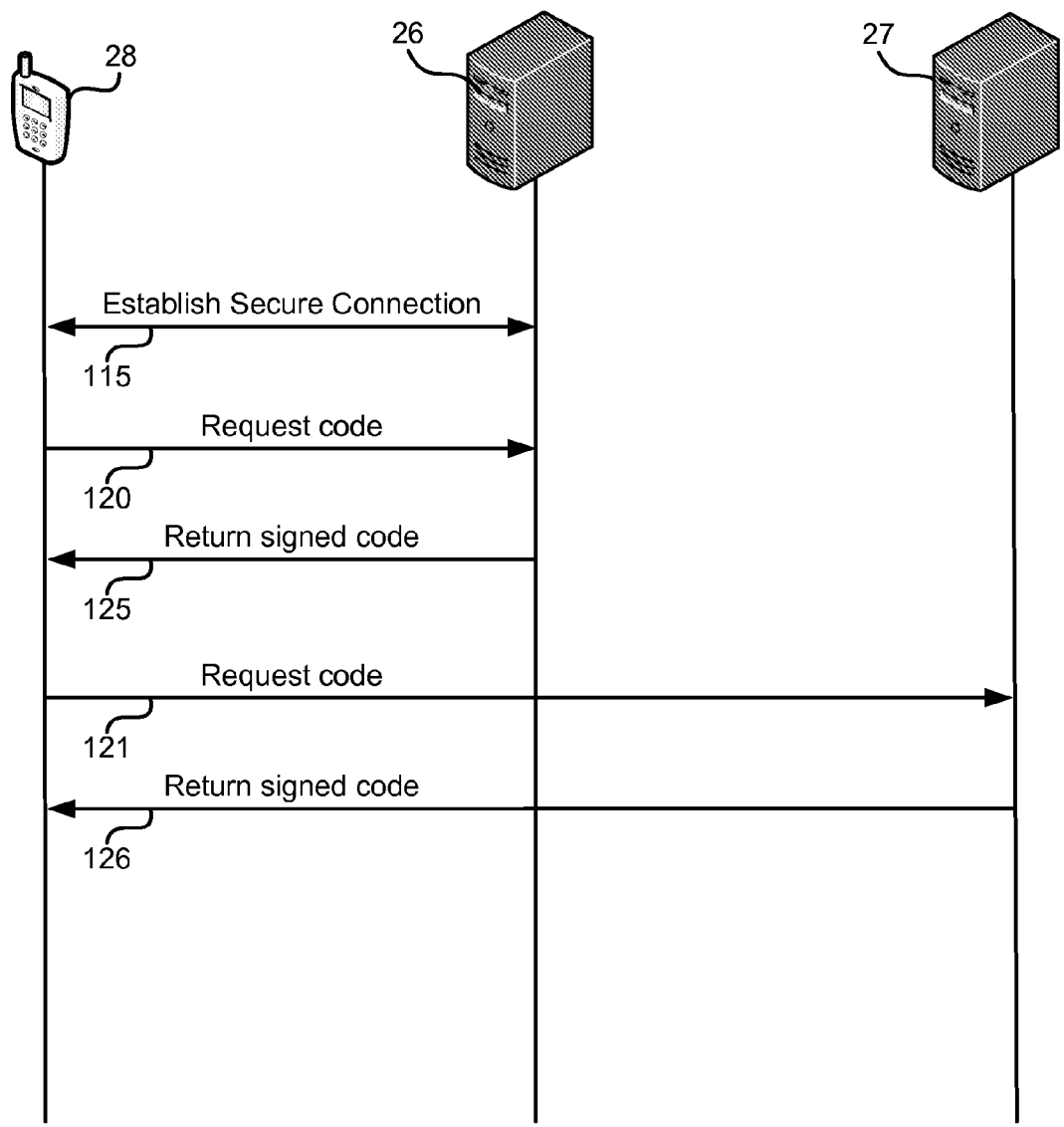
FIG. 6 is a message flow diagram of an embodiment for establishing a trusted browsing environment.

Web browsing environments that do not utilize robust security measures described herein may choose to limit script functionality by prohibiting scripts from integrating with scripts originating from servers other than the particular server from which the script originated. For example, a web page may include a JavaScript script for generating a menu system. It may be useful for a website menu system to have links to news websites or weather websites. However, web browsers such as Firefox® and Internet Explorer® may not allow the menu script to communicate with the news server. In a trusted web browsing environment, such a prohibition can be easily lifted. An example of a mobile handset allowing a script to contact a second server is shown in FIG. 6, which shows communications that may occur between systems. The mobile handset 28 may navigate to a web site on web server 26, and the systems may establish a secure connection, messages 115. The mobile handset 28 may request a web page from the web server 26, message 120. The web server 26 may respond to the request with signed code for the mobile handset 28 to execute, message 125. In response to executing the code from the web server 26, the mobile handset may request a script from another web server 27 to extend the functionality of the current menu script, message 121. The web server 27 generates code and signs it, and sends the signed code to the mobile handset 28, message 126. In a traditional web browser, the web browser may prevent the execution of the script from web browser, or limit its ability to interact with the existing document.

Figure 7:
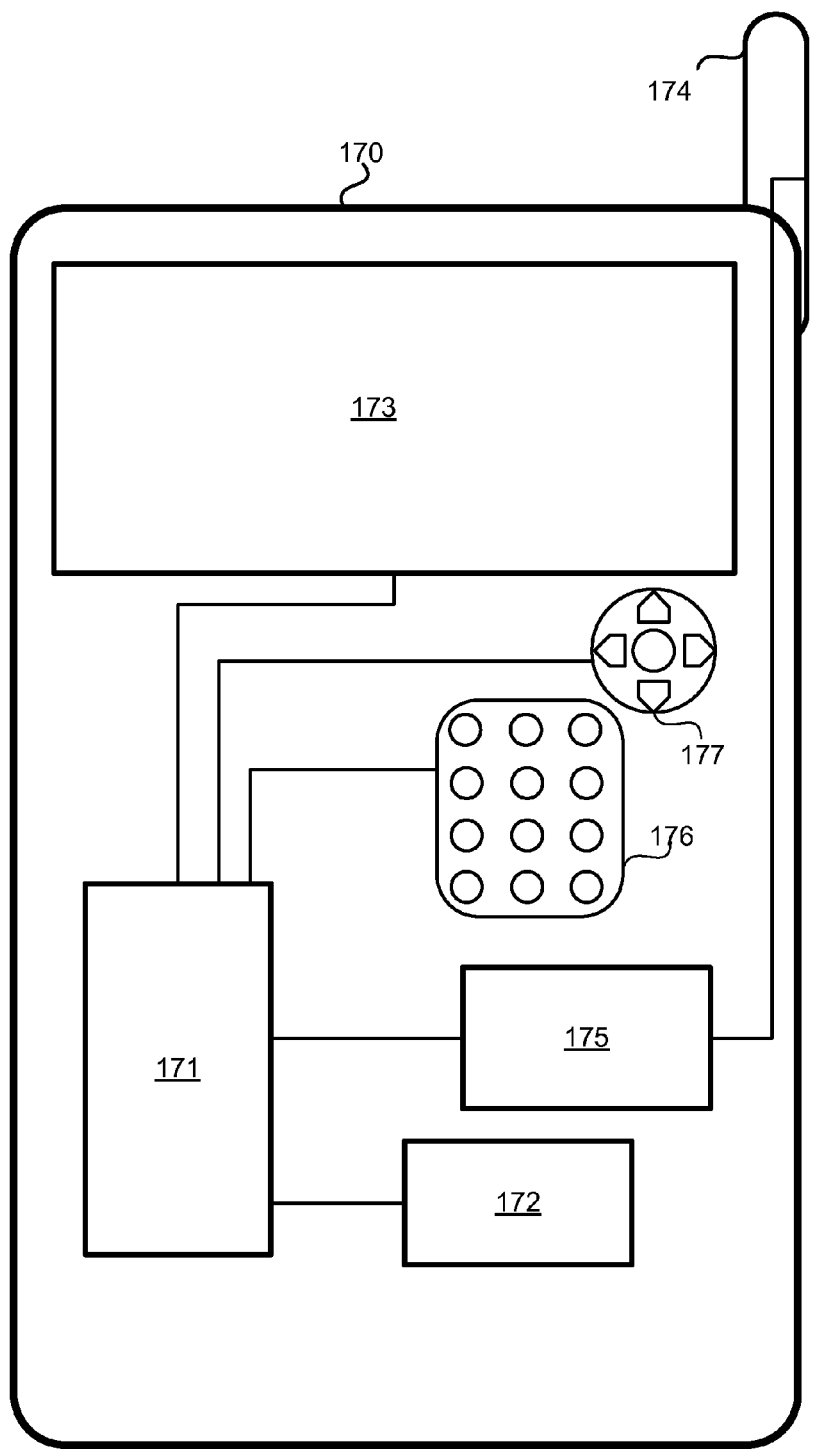
FIG. 7 is a circuit block diagram of an example mobile device suitable for use with the various embodiments.

The embodiments described above may be implemented on any of a variety of mobile handsets, such as, for example, cellular telephones, personal data assistants (PDA) with cellular telephone, mobile electronic mail receivers, mobile web access devices, and other processor equipped devices that may be developed in the future that connect to a wireless network. Typically, such mobile handsets will have in common the components illustrated in FIG. 7. For example, the mobile handset 170 may include a processor 171 coupled to internal memory 172 and a display 173. Additionally, the mobile handset 170 will have an antenna 174 for sending and receiving electromagnetic radiation that is connected to a wireless data link and/or cellular telephone transceiver 175 coupled to the processor 171. In some implementations, the transceiver 175 and portions of the processor 171 and memory 172 used for cellular telephone communications is referred to as the air interface since it provides a data interface via a wireless data link.

The processor 171 may be any programmable microprocessor, microcomputer or multiple processor chip or chips that can be configured by software instructions (applications) to perform a variety of functions, including the functions of the various embodiments described above. In some mobile handsets, multiple processors 171 may be provided, such as one processor dedicated to wireless communication functions and one processor dedicated to running other applications. Typically, software applications may be stored in the internal memory 172 before they are accessed and loaded into the processor 171. In some mobile handsets, the processor 171 may include internal memory sufficient to store the application software instructions. For the purposes of this description, the term memory refers to all memory accessible by the processor 171, including internal memory 172 and memory within the processor 171 itself. User data files are typically stored in the memory 172. In many mobile handsets, the memory 172 may be a volatile or nonvolatile memory, such as flash memory, or a mixture of both. Mobile handsets typically include a key pad 176 or miniature keyboard and menu selection buttons or rocker switches 177 for receiving user inputs.

Figure 8:
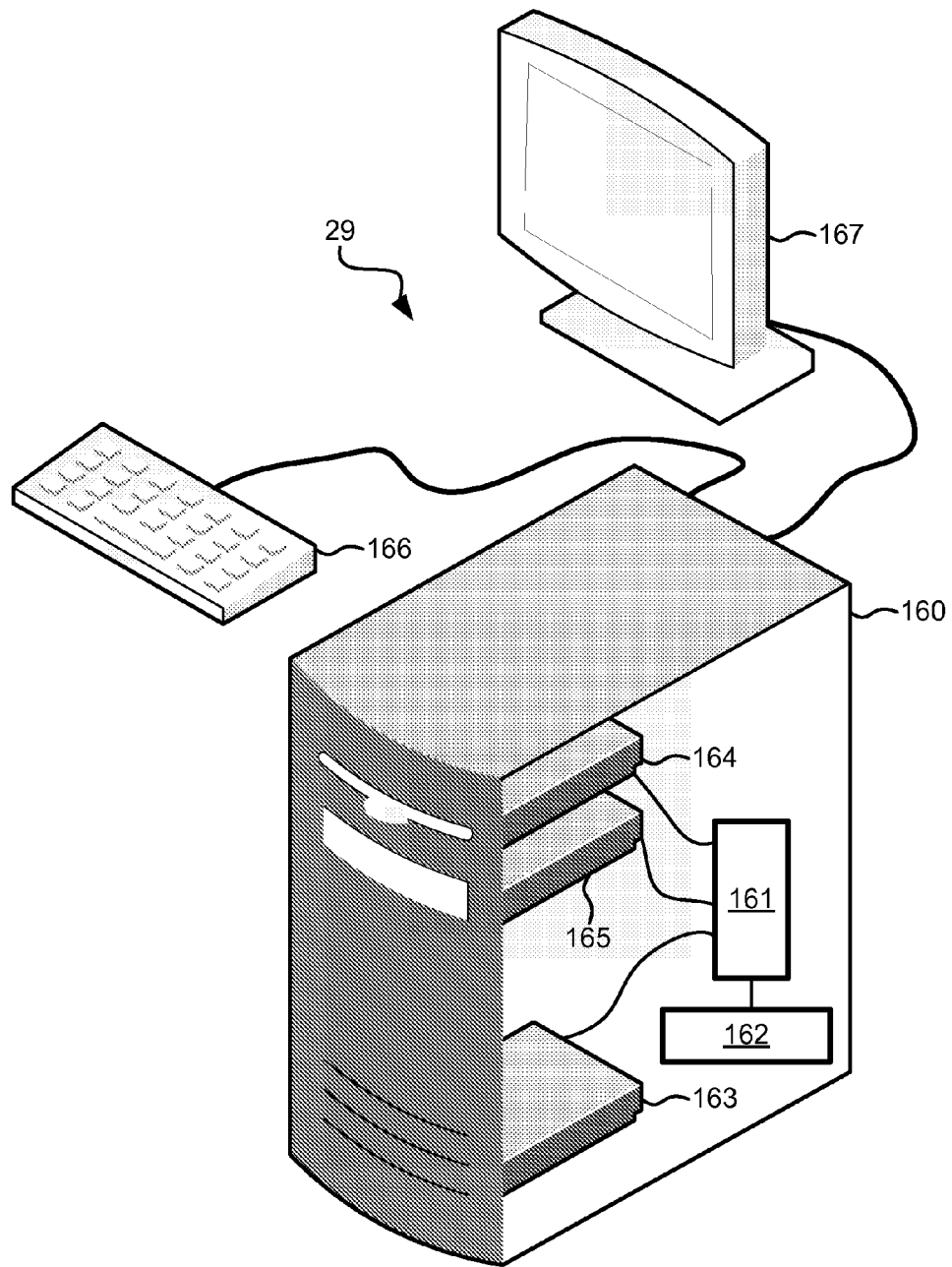
FIG. 8 is a circuit block diagram of an example personal computer suitable for use with the various embodiments.

The embodiments described above may also be implemented on any of a variety of computing devices, such as, for example a personal computer 29 illustrated in FIG. 8. Such a personal computer 29 typically includes a computer housing 160, a processor 161 coupled to volatile memory 162 and a large capacity nonvolatile memory, such as a disk drive 163. The computer 29 may also include a floppy disc drive 164 and a compact disc (CD) drive 165 coupled to the processor 161. Typically the computer 29 will also include a user input device like a keyboard 166 and a display 137. The computer 29 may also include a number of connector ports for receiving external memory devices coupled to the processor 161, such as a universal serial bus (USB) port (not shown), as well as network connection circuits (not shown) for coupling the processor 161 to a network. In a laptop configuration, the computer housing 160 includes the keyboard 166 and the display 137.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

I claim:

1. A method for executing a client-server application on a mobile device, comprising:
   receiving from a server a script for execution on the mobile device, wherein the received script requests access to a first mobile device resource;
   receiving, on the mobile device, a digital certificate issued to the server, wherein the digital certificate contains a list of mobile device resources for which the server has been granted permission;
   verifying the digital certificate and confirming that the script has not been modified since the digital certificate was created;
   determining whether the first mobile device resource is identified in the list of mobile device resources for which the server has been granted permission; and
   allowing access by the server to the first mobile device resource in response to determining that the first mobile device resource is identified in the list of mobile device resources for which the server has been granted permission that is contained in the digital certificate, wherein allowing access comprises:
      enabling the script to access the first mobile device resource; and
      transmitting to the server data relating to the first mobile device resource.

2. The method of claim 1, further comprising receiving a digital signature for the script comprising an encrypted first fingerprint of the script,
   wherein the step of verifying the digital certificate and confirming that the script has not been modified comprises:
      determining that the digital certificate was issued to the server by a trusted third party;
      determining a public key of the server from the digital certificate;
      decrypting the encrypted fingerprint using a public key of the server;
      generating a second fingerprint of the script; and
      comparing the value of the first fingerprint to the value of the second fingerprint.

3. The method of claim 1, wherein permission for the mobile device resources in the list contained in the digital certificate is granted to the server by a trusted third party.

4. The method of claim 1, further comprising requesting a service from the server, wherein the received script was generated at the server in response to the request for the service.

5. The method of claim 2, wherein determining that the digital certificate was issued to the server by a trusted third party comprises determining that the digital certificate was issued to the server by a certificate authority that is inherently trusted.

6. The method of claim 2, wherein determining that the digital certificate was issued to the server by a trusted third party comprises determining that the digital certificate was issued to the server by a certificate authority that is linked to an inherently trusted certificate authority by a chain of digital certificates.

7. The method of claim 1, further comprising:
   requesting a digital signature for the script from the server; and
   receiving a digital signature for the script in response to the request for the digital signature.

8. The method of claim 1, further comprising:
   requesting a digital signature for the script from a trusted third party; and
   receiving a digital signature for the script in response to the request for the digital signature.

9. The method of claim 1, further comprising:
   requesting a digital signature for a web page from the server;
   receiving the digital signature from the server;
   verifying the digital signature from the server; and
   enabling the script to access confidential data on the mobile device if the digital signature from the server is verified by the mobile device.

10. The method of claim 1, further comprising:
    requesting a digital signature for the server from a trusted third party;
    receiving a digital signature for the server;
    verifying the digital signature from the server; and
    enabling the script to access confidential data on the mobile device if the digital signature from the server is verified by the mobile device.

11. The method of claim 1, further comprising:
    limiting permissions granted to the script based upon information within the script; and
    enabling the script to access the first mobile device resource only if the first mobile device resource is encompassed within the limited permissions.

12. The method of claim 1, further comprising:
    receiving a user input designating a server or server content to be trusted;
    determining if the script was received from a designated trusted server or is server content that has been designated as trusted; and
    enabling the script to access a second mobile device resource if the script was received from a designated trusted server or is server content that has been designated as trusted.

13. A mobile device, comprising:
    a processor;
    a transceiver coupled to the processor; and
    a memory coupled to the processor;
    wherein the processor is configured with software instructions to perform steps comprising:
       receiving from a server a script for execution on the mobile device, wherein the received script requests access to a first mobile device resource;
       receiving a digital certificate issued to the server, wherein the digital certificate contains a list of mobile device resources for which the server has been granted permission;
       verifying the digital certificate and confirming that the script has not been modified since the digital certificate was created;
       determining whether the first mobile device resource is identified in the list of mobile device resources for which the server has been granted permission; and
       allowing access by the server to the first mobile device resource in response to determining that the first mobile device resource is identified in the list of mobile device resources for which the server has been granted permission that is contained in the digital certificate, wherein allowing access comprises:
 enabling the script to access the first mobile device resource; and
 transmitting to the server data relating to the first mobile device resource.

14. The mobile device of claim 13, wherein the processor is configured with software instructions to perform further steps comprising:
 receiving a digital signature for the script in the form of an encrypted first fingerprint of the script;
 verifying the digital certificate and confirming that the script has not been modified since the digital certificate was created by performing steps comprising:
  determining that the digital certificate was issued to the server by a trusted third party;
  determining a public key of the server from the digital certificate;
  decrypting the encrypted fingerprint using a public key of the server;
  generating a second fingerprint of the script; and
  comparing the value of the first fingerprint to the value of the second fingerprint.

15. The mobile device of claim 13, wherein the processor is configured with software instructions to perform further steps such that permission for the mobile device resources in the list contained in the digital certificate is granted to the server by a trusted third party.

16. The mobile device of claim 13, wherein the processor is configured with software instructions to perform further steps comprising requesting a service from the server, wherein the received script was generated at the server in response to the request for the service.

17. The mobile device of claim 14, wherein the processor is configured with software instructions to perform further steps comprising determining that the digital certificate was issued to the server by a certificate authority that is inherently trusted.

18. The mobile device of claim 14, wherein the processor is configured with software instructions to perform further steps comprising determining that the digital certificate was issued to the server by a certificate authority that is linked to an inherently trusted certificate authority by a chain of digital certificates.

19. The mobile device of claim 13, wherein the processor is configured with software instructions to perform further steps comprising:
 requesting a digital signature for the script from the server; and
 receiving a digital signature for the script in response to the request for the digital signature.

20. The mobile device of claim 13, wherein the processor is configured with software instructions to perform further steps comprising:
 requesting a digital signature for the script from a trusted third party; and
 receiving a digital signature for the script in response to the request for the digital signature.

21. The mobile device of claim 13, wherein the processor is configured with software instructions to perform further steps comprising:
 requesting a digital signature for a web page from the server;
 receiving the digital signature from the server;
 verifying the digital signature from the server; and
 enabling the script to access confidential data on the mobile device if the digital signature from the server is verified by the mobile device.

22. The mobile device of claim 13, wherein the processor is configured with software instructions to perform further steps comprising:
 requesting a digital signature for the server from a trusted third party;
 receiving a digital signature for the server;
 verifying the digital signature for the server; and
 enabling the script to access confidential data on the mobile device if the digital signature from the server is verified by the mobile device.

23. The mobile device of claim 13, wherein the processor is configured with software instructions to perform further steps comprising:
 limiting permissions granted to the script based upon information within the script; and
 enabling the script to access the first mobile device resource only if the first mobile device resource is encompassed within the limited permissions.

24. The mobile device of claim 13, wherein the processor is configured with software instructions to perform further steps comprising:
 receiving a user input designating a server or server content to be trusted;
 determining if the script was received from a designated trusted server or is server content that has been designated as trusted; and
 enabling the script to access a second mobile device resource if the script was received from a designated trusted server or is server content that has been designated as trusted.

25. A non-transitory storage medium having stored thereon processor-executable software instructions configured to cause a mobile device processor to perform steps comprising:
 receiving from a server a script for execution on a mobile device, wherein the received script requests access to a first resource of the mobile device;
 receiving a digital certificate issued to the server, wherein the digital certificate contains a list of mobile device resources for which the server has been granted permission;
 verifying the digital certificate and confirming that the script has not been modified since the digital certificate was created;
 determining whether the first resource of the mobile device is identified in the list of mobile device resources for which the server has been granted permission; and
 allowing access by the server to the first mobile device resource in response to determining that the first mobile device resource is identified in the list of mobile device resources for which the server has been granted permission that is contained in the digital certificate, wherein allowing access comprises:
  enabling the script to access the first mobile device resource; and
  transmitting to the server data relating to the first mobile device resource.

26. The non-transitory storage medium of claim 25, wherein the processor-executable software instructions stored thereon are further configured to cause the mobile device processor to perform steps comprising:
 receiving a digital signature for the script in the form of an encrypted first fingerprint of the script; and
 wherein the processor-executable software instructions stored thereon are configured such that verifying the digital certificate and confirming that the script has not been modified since the digital certificate was created comprises:
determining that the digital certificate was issued to the server by a trusted third party;
determining a public key of the server from the digital certificate;
decrypting the encrypted fingerprint using a public key of the server;
generating a second fingerprint of the script; and
comparing the value of the first fingerprint to the value of the second fingerprint.

27. The non-transitory storage medium of claim 25, wherein the processor-executable software instructions stored thereon are further configured such that permission for the mobile device resources in the list contained in the digital certificate are granted to the server by a trusted third party.

28. The non-transitory storage medium of claim 25, wherein the processor-executable software instructions stored thereon are further configured to cause the mobile device processor to perform steps further comprising requesting a service from the server, wherein the received script was generated at the server in response to the request for the service.

29. The non-transitory storage medium of claim 26, wherein the processor-executable software instructions stored thereon are further configured to cause the mobile device processor to perform steps further comprising determining that the digital certificate was issued to the server by a certificate authority that is inherently trusted.

30. The non-transitory storage medium of claim 26, wherein the processor-executable software instructions stored thereon are further configured to cause the mobile device processor to perform steps further comprising determining that the digital certificate was issued to the server by a certificate authority that is linked to an inherently trusted certificate authority by a chain of digital certificates.

31. The non-transitory storage medium of claim 25, wherein the processor-executable software instructions stored thereon are further configured to cause the mobile device processor to perform steps further comprising:
requesting a digital signature for the script from the server; and
receiving a digital signature for the script in response to the request for the digital signature.

32. The non-transitory storage medium of claim 25, wherein the processor-executable software instructions stored thereon are further configured to cause the mobile device processor to perform steps further comprising:
requesting a digital signature for the script from a trusted third party; and
receiving the digital signature for the script.

33. The non-transitory storage medium of claim 25, wherein the processor-executable software instructions stored thereon are further configured to cause the mobile device processor to perform steps further comprising:
requesting a digital signature for a web page from the server;
receiving the digital signature from the server;
verifying the digital signature from the server; and
enabling the script to access confidential data on the mobile device if the digital signature from the server is verified by the mobile device.

34. The non-transitory storage medium of claim 25, wherein the processor-executable software instructions stored thereon are further configured to cause the mobile device processor to perform steps further comprising:
requesting a digital signature for the server from a trusted third party;
receiving the digital signature for the server;
verifying the digital signature for the server; and
enabling the script to access confidential data on the mobile device if the digital signature from the server is verified by the mobile device.

35. The non-transitory storage medium of claim 25, wherein the processor-executable software instructions stored thereon are further configured to cause the mobile device processor to perform steps comprising:
limiting permissions granted to the script based upon information within the script; and
enabling the script to access a requested resource only if the requested resource is encompassed within the limited permissions.

36. The non-transitory storage medium of claim 25, wherein the processor-executable software instructions stored thereon are further configured to cause the mobile device processor to perform steps comprising:
receiving a user input designating a server or server content to be trusted;
determining if the script was received from a designated trusted server or is server content that has been designated as trusted; and
enabling the script to access a second mobile device resource if the script was received from a designated trusted server or is server content that has been designated as trusted.

37. A mobile device, comprising:
means for receiving from a server a script for execution on the mobile device, wherein the received script requests access to a first mobile device resource;
means for receiving a digital certificate issued to the server, wherein the digital certificate contains a list of mobile device resources for which the server has been granted permission;
means for verifying the digital certificate and confirming that the script has not been modified since the digital certificate was created;
means for determining whether the first mobile device resource is identified in the list of mobile device resources for which the server has been granted permission; and
means for allowing access by the server to the first mobile device resource in response to determining that the first mobile device resource is identified in the list of mobile device resources for which the server has been granted permission that is contained in the digital certificate, wherein means for allowing access by the server comprises:
means for enabling the script to access the first mobile device resource; and
means for transmitting to the server data relating to the first mobile device resource.

38. The mobile device of claim 37, further comprising;
means for receiving a digital signature for the script in the form of an encrypted first fingerprint of the script; and
wherein means for verifying the digital certificate and confirming that the script has not been modified comprises:
means for determining that the digital certificate was issued to the server by a trusted third party;
means for determining a public key of the server from the digital certificate;
means for decrypting the encrypted fingerprint using a public key of the server;

means for generating a second fingerprint of the script; and means for comparing the value of the first fingerprint to the value of the second fingerprint.

39. The mobile device of claim 37, wherein permission for the mobile device resources in the list contained in the digital certificate is granted to the server by a trusted third party.

40. The mobile device of claim 37, further comprising means for requesting a service from the server, wherein the received script was generated at the server in response to the request for the service.

41. The mobile device of claim 39, wherein means for determining that the digital certificate was issued to the server by a trusted third party comprises means for wherein the processor-executable software instructions stored thereon are further configured to cause the mobile device processor to perform steps comprising determining that the digital certificate was issued to the server by a certificate authority that is inherently trusted.

42. The mobile device of claim 39, wherein means for determining that the digital certificate was issued to the server by a trusted third party comprises means for determining that the digital certificate was issued to the server by a certificate authority that is linked to an inherently trusted certificate authority by a chain of digital certificates.

43. The mobile device of claim 38, further comprising:
means for requesting a digital signature for the script from the server; and
means for receiving the digital signature.

44. The mobile device of claim 38, further comprising:
means for requesting a digital signature for the script from a trusted third party; and
means for receiving the digital signature.

45. The mobile device of claim 38, further comprising:
means for requesting a digital signature for a web page from the server;
means for receiving the digital signature from the server;
means for verifying the digital signature from the server; and
means for enabling the script to access confidential data on the mobile device if the digital signature from the server is verified by the mobile device.

46. The mobile device of claim 38, further comprising:
means for requesting a digital signature for the server from a trusted third party;
means for receiving the digital signature for the server;
means for verifying the digital signature for the server; and
means for enabling the script to access confidential data on the mobile device if the digital signature from the server is verified by the mobile device.

47. The mobile device of claim 38, further comprising:
means for limiting permissions granted to the script based upon information within the script; and
means for enabling the script to access the first mobile device resource only if the first mobile device resource is encompassed within the limited permissions.

48. The mobile device of claim 38, further comprising:
means for receiving a user input designating a server or server content to be trusted;
means for determining if the script was received from a designated trusted server or is server content that has been designated as trusted; and
means for enabling the script to access a second mobile device resource if the script was received from a designated trusted server or is server content that has been designated as trusted.

49. A method for executing a client-server application on a mobile device, comprising:
receiving from a server a script for execution on the mobile device, wherein the received script requests access to a protected resource of the mobile device;
verifying that the server from which the script was received is named in a certificate;
identifying permissions that have been granted to the server according to the contents of the certificate;
determining whether a permission associated with the protected resource of the mobile device is included in the identified permissions that have been granted to the server; and
allowing access by the server to the protected resource of the mobile device in response to determining, based on the contents of the certificate, that a permission associated with the protected resource is included in the identified permissions that have been granted to the server, wherein allowing access comprises:
enabling the script to access the protected resource of the mobile device; and
transmitting to the server data relating to the protected resource.

50. The mobile device of claim 49, wherein the certificate is pre-configured in the mobile device.

51. A mobile device, comprising:
a processor;
a transceiver coupled to the processor; and
a memory coupled to the processor;
wherein the processor is configured with software instructions to perform steps comprising:
receiving from a server a script for execution on the mobile device, wherein the received script requests access to a protected resource of the mobile device;
verifying that the server from which the script was received is named in a certificate;
identifying permissions that have been granted to the server according to the contents of the certificate;
determining whether a permission associated with the protected resource of the mobile device is included in the identified permissions that have been granted to the server; and
allowing access by the server to the protected resource of the mobile device in response to determining, based on the contents of the certificate, that a permission associated with the protected resource is included in the identified permissions that have been granted to the server, wherein allowing access comprises:
enabling the script to access the protected resource of the mobile device; and
transmitting to the server data relating to the protected resource.

52. The mobile device of claim 51, wherein the certificate is pre-configured in the mobile device.

53. A tangible non-transitory storage medium having stored thereon processor-executable software instructions configured to cause a processor of a mobile device to perform steps comprising:
receiving from a server a script for execution on the mobile device, wherein the received script requests access to a protected resource of the mobile device;
verifying that the server from which the script was received is named in a certificate;
identifying permissions that have been granted to the server according to the contents of the certificate;

determining whether a permission associated with the protected resource of the mobile device is included in the identified permissions that have been granted to the server; and allowing access by the server to the protected resource of the mobile device in response to determining, based on the contents of the certificate, that a permission associated with the protected resource is included in the identified permission that have been granted to the server, wherein allowing access comprises:

enabling the script to access the protected resource of the mobile device; and transmitting to the server data relating to the protected resource.

54. The tangible non-transitory storage medium of claim 53, wherein the certificate is pre-configured in the mobile device.

55. A mobile device, comprising:

means for receiving from a server a script for execution on the mobile device, wherein the received script requests access to a protected resource of the mobile device;

means for verifying that the server from which the script was received is named in a certificate;

means for identifying permissions that have been granted to the server according to the contents of the certificate;

means for determining whether a permission associated with the protected resource of the mobile device is included in the identified permissions that have been granted to the server; and means for allowing access by the server to the protected resource of the mobile device in response to determining, based on the contents of the certificate, that a permission associated with the protected resource is included in the identified permissions that have been granted to the server, wherein means for allowing access comprises:

means for enabling the script to access the protected resource of the mobile device; and means for transmitting to the server data relating to the protected resource.

56. The mobile device of claim 55, wherein the certificate is pre-configured in the mobile device.

\* \* \* \* \*